United States Patent
Yuan et al.

(10) Patent No.: US 8,047,719 B2
(45) Date of Patent: Nov. 1, 2011

(54) MOTOR SHAFT SUPPORT DEVICE

(75) Inventors: Shao-Chung Yuan, Taipei Hsien (TW);
Yin-Jao Luo, Taipei Hsien (TW);
An-Zheng Yang, Taipei Hsien (TW);
Yi-Cheng Su, Taipei Hsien (TW);
Chia-Ching Lin, Taipei Hsien (TW)

(73) Assignee: Foxnum Technology Co., Ltd.,
Tu-Cheng, New Taipei (TW)

( * ) Notice: Subject to any disclaimer, the term of this patent is extended or adjusted under 35 U.S.C. 154(b) by 457 days.

(21) Appl. No.: 12/266,564

(22) Filed: Nov. 7, 2008

(65) Prior Publication Data

US 2010/0061670 A1    Mar. 11, 2010

(30) Foreign Application Priority Data

Sep. 5, 2008  (CN) .......................... 2008 1 0304372

(51) Int. Cl.
*F16C 35/06*    (2006.01)
*F16C 43/04*    (2006.01)

(52) U.S. Cl. ........................................ 384/438; 384/542

(58) Field of Classification Search .................. 384/428,
384/437–440, 537, 539, 542–543, 616
See application file for complete search history.

(56) References Cited

U.S. PATENT DOCUMENTS

| | | | | | |
|---|---|---|---|---|---|
| 2,253,119 | A | * | 8/1941 | Goerth ........................... | 384/453 |
| 2,452,428 | A | * | 10/1948 | Bryant ............................. | 74/504 |
| 2,702,106 | A | * | 2/1955 | Strahota et al. ............. | 192/18 R |
| 3,044,594 | A | * | 7/1962 | Bernard ........................ | 192/84.7 |
| 3,087,078 | A | * | 4/1963 | Brown ............................. | 310/83 |
| 3,089,737 | A | * | 5/1963 | Bradley ........................ | 384/473 |
| 3,204,483 | A | * | 9/1965 | Carr ............................. | 74/606 R |
| 3,238,805 | A | * | 3/1966 | Rieser ............................ | 74/421 A |
| 3,249,986 | A | * | 5/1966 | Adkins .......................... | 384/616 |
| 3,368,264 | A | * | 2/1968 | Wilkinson ................... | 29/893.1 |
| 3,469,897 | A | * | 9/1969 | Rike ............................... | 384/542 |
| 3,494,208 | A | * | 2/1970 | Alagna ........................... | 474/199 |
| 3,653,732 | A | * | 4/1972 | Fairbank ...................... | 384/492 |
| 5,209,194 | A | * | 5/1993 | Adachi et al. ............. | 123/90.17 |
| 6,045,268 | A | * | 4/2000 | Long et al. .................... | 384/542 |

FOREIGN PATENT DOCUMENTS

JP    63076915 A  *  4/1988

* cited by examiner

*Primary Examiner* — Marcus Charles
(74) *Attorney, Agent, or Firm* — Altis Law Group, Inc.

(57) ABSTRACT

A support device for a shaft extension of a motor, the motor including a flange facing and a shaft, the shaft not protruding outward beyond the flange facing. The support device includes a retainer and a bearing. The retainer includes a receiving chamber. The retainer is fastened to the flange facing of the motor. The bearing includes an inner hole. The bearing is received in the receiving chamber of the retainer. A shaft extension is coupled with the shaft of the motor through the inner hole of the bearing. The shaft extension is supported by the retainer and bearing.

12 Claims, 5 Drawing Sheets

MOTOR SHAFT SUPPORT DEVICE

BACKGROUND

1. Technical Field

The disclosure generally relates to motor structure and, particularly, to a support device for an extended motor shaft.

2. Description of Related Art

Referring to FIG. 5, a related-art motor 1 includes a shaft 2 and a flange facing 3. The shaft 2 of the motor, not protruding outward beyond the flange facing 31, cannot engage a load. Accordingly, a shaft extension 4 is coupled to the shaft 2 of the motor 1, protruding outward beyond the flange facing 3 of the motor 1, allowing engagement of a load. However, the center of the shaft extension 4 is not supported, thus generates noise and vibration when the motor 10 is operating. Furthermore, addition of the shaft extension 4 is difficult and often inaccurately aligned with the shaft 2.

What is needed, therefore, is a support device which can overcome the limitations described.

DETAILED DESCRIPTION OF THE EMBODIMENT

Figure 1:
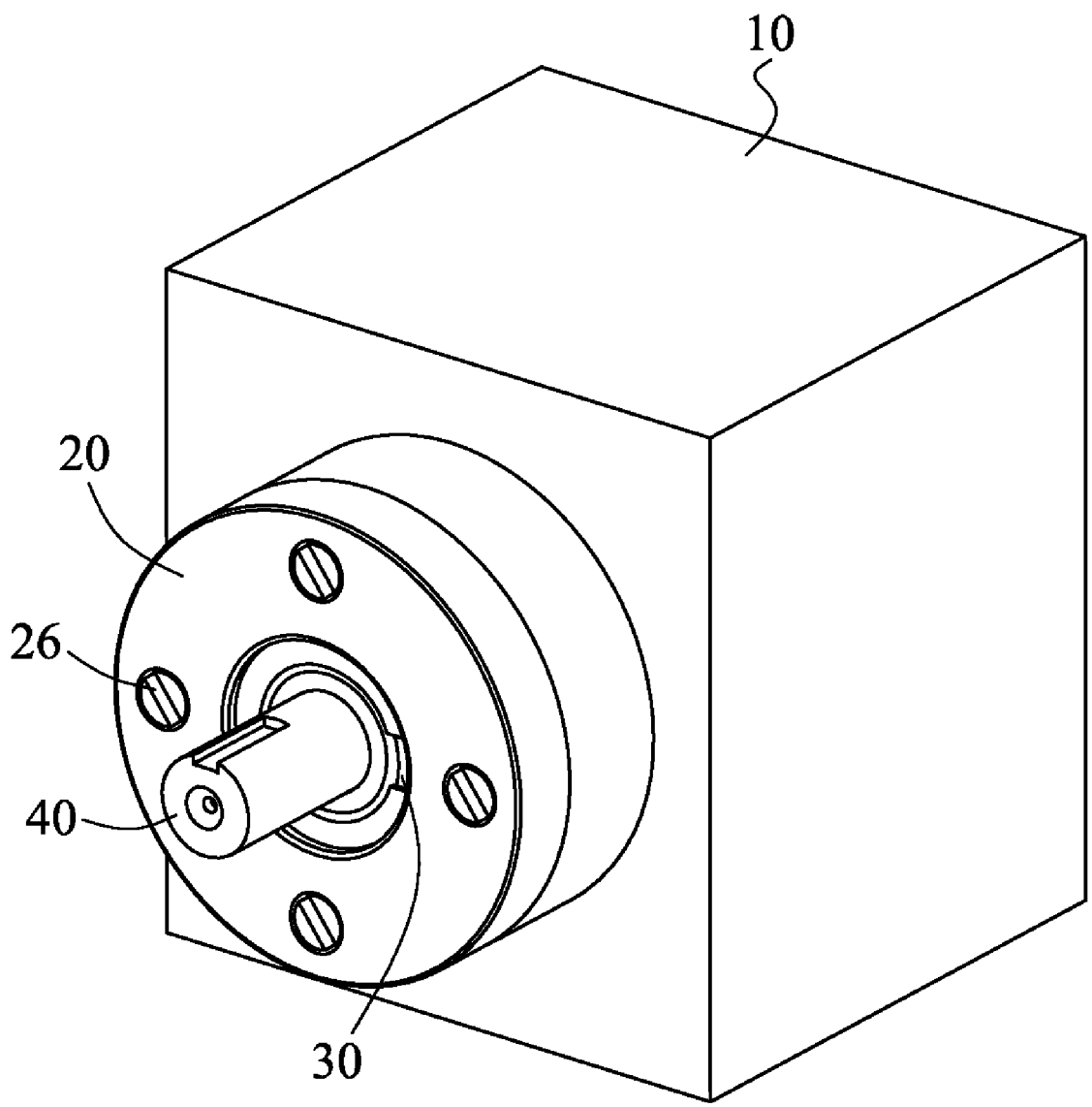
FIG. 1 is an assembled isometric view of a support device for a shaft extension of a motor in accordance with an embodiment of the disclosure.
Figure 2:
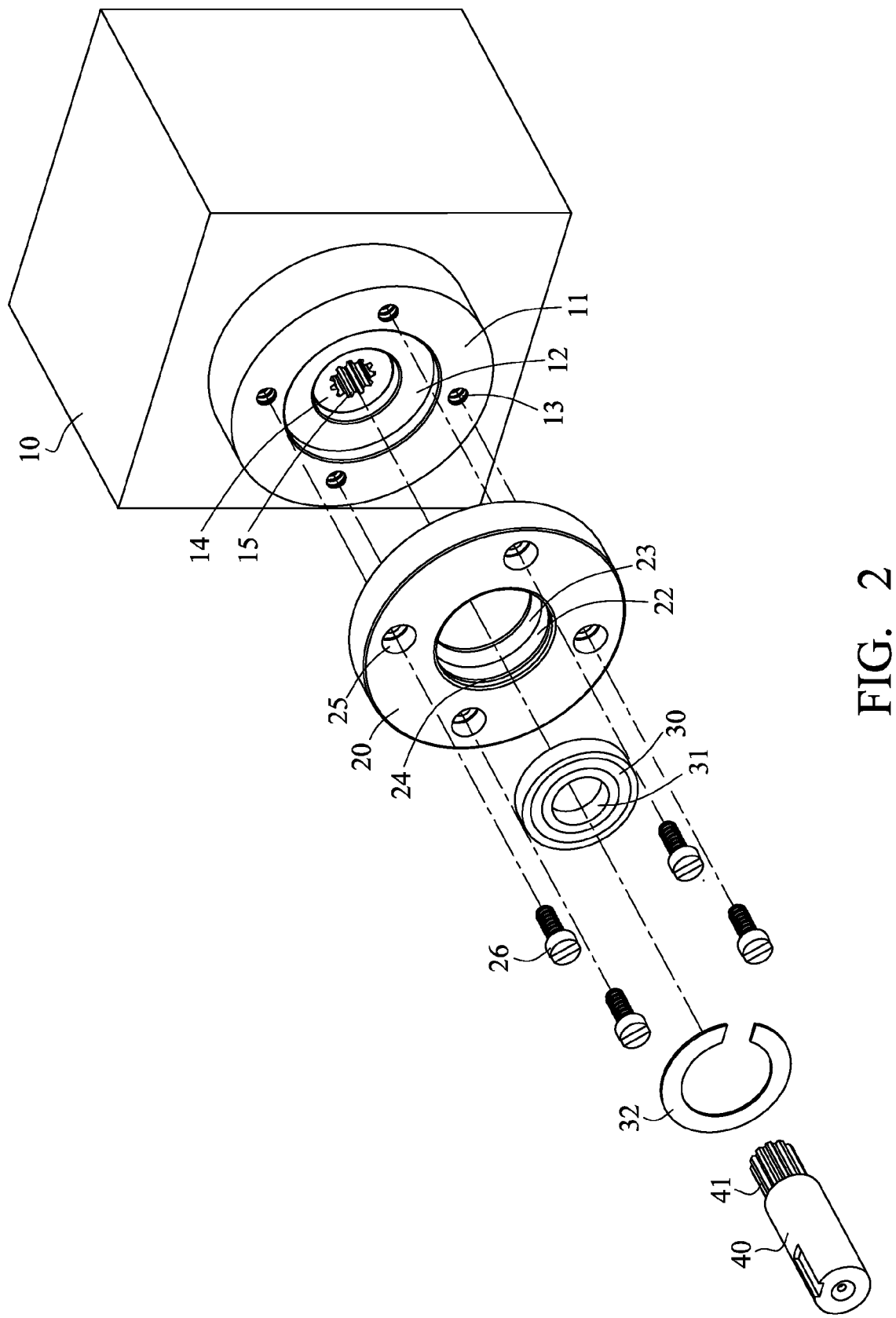
FIG. 2 is an exploded, isometric view of the support device of FIG. 1.

Referring to FIGS. 1 and 2, a support device for a shaft extension of a motor in accordance with a first embodiment of the disclosure includes a retainer 20 and a bearing 30. The bearing 30 is coupled with the retainer 20. The retainer 20 is coupled with a flange facing 11 of a motor 10.

The motor 10 includes the flange facing 11 defined in a end and a shaft 14 defining a slot 15 therein. The center of the flange facing 11 defines a recessed portion 12. Four screw holes 13 are defined in the flange facing 11. The shaft 14 does not protrude beyond the flange facing 11 of the motor 10.

Figure 3:
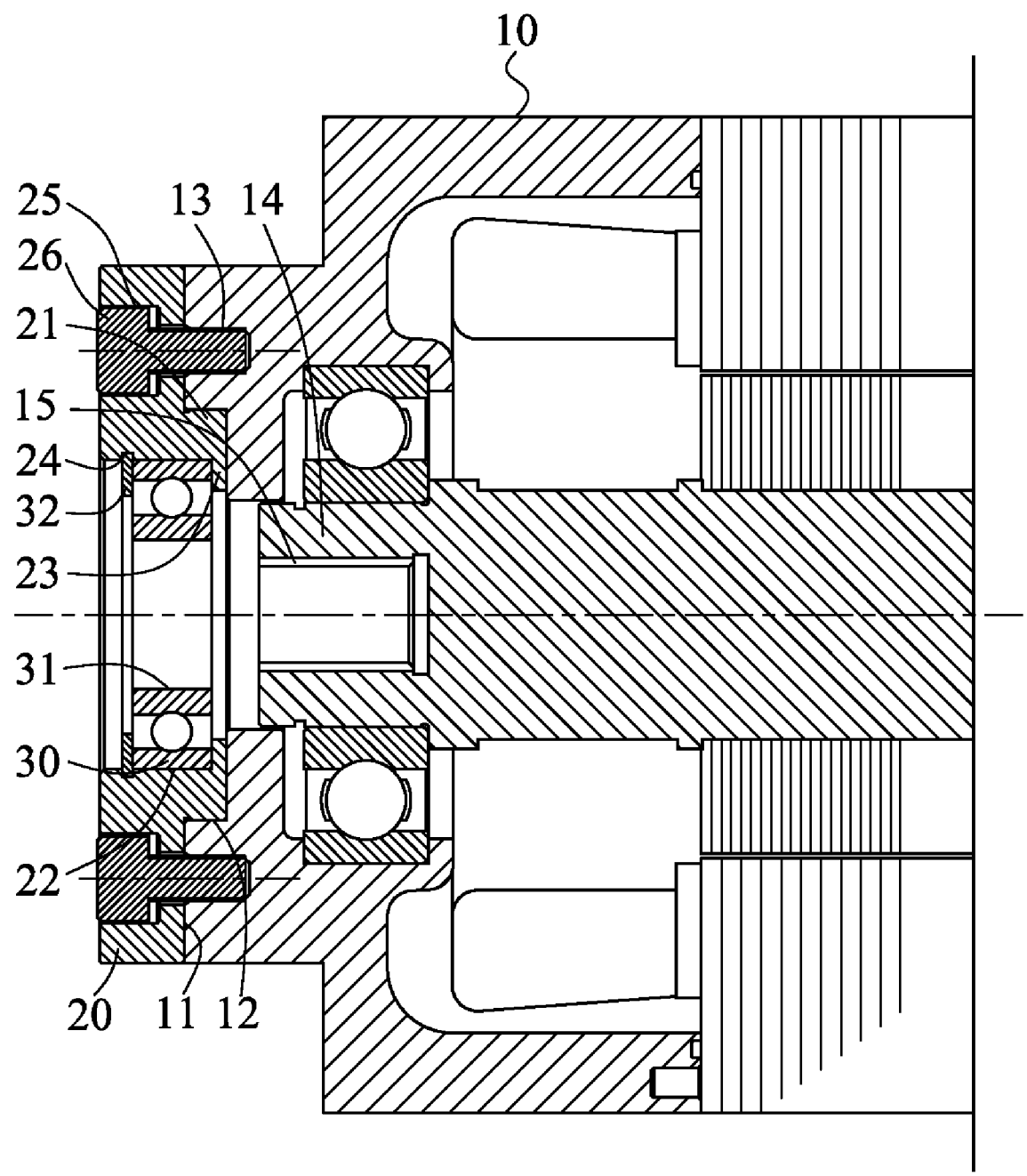
FIG. 3 is a sectional view of the support device of in FIG. 1 without the shaft extension.

Also referring to FIG. 3, an end of the retainer 20 defines a raised portion 21 received in the recessed portion 12 of the motor 10. The center of the retainer 20 defines a receiving chamber 22 receiving the bearing 30. An annular groove 24 is defined in an end of a peripheral wall defining the receiving chamber 22. An annular ledge 23 projects inward from the other end of the peripheral wall defining the receiving chamber 22. Four through holes 25 are defined in the other end of the retainer 20. Four fastening screws 26 enter the screw holes 13 on the motor 10 after passing through corresponding through holes 25 on the retainer 20. The retainer 20 is thus fastened to the flange facing 11 of the motor 10. Here, the retainer 20, raised portion 21, and receiving chamber 22 are all cylindrical. The through holes 25 are equidistant from each other.

The bearing 30 includes an inner hole 31. The bearing 30 is received in the receiving chamber 22 of the retainer 20. A C-shaped snap ring 32 is mounted in the annular groove 24, securing the bearing 30 in the receiving chamber 22.

Figure 4:
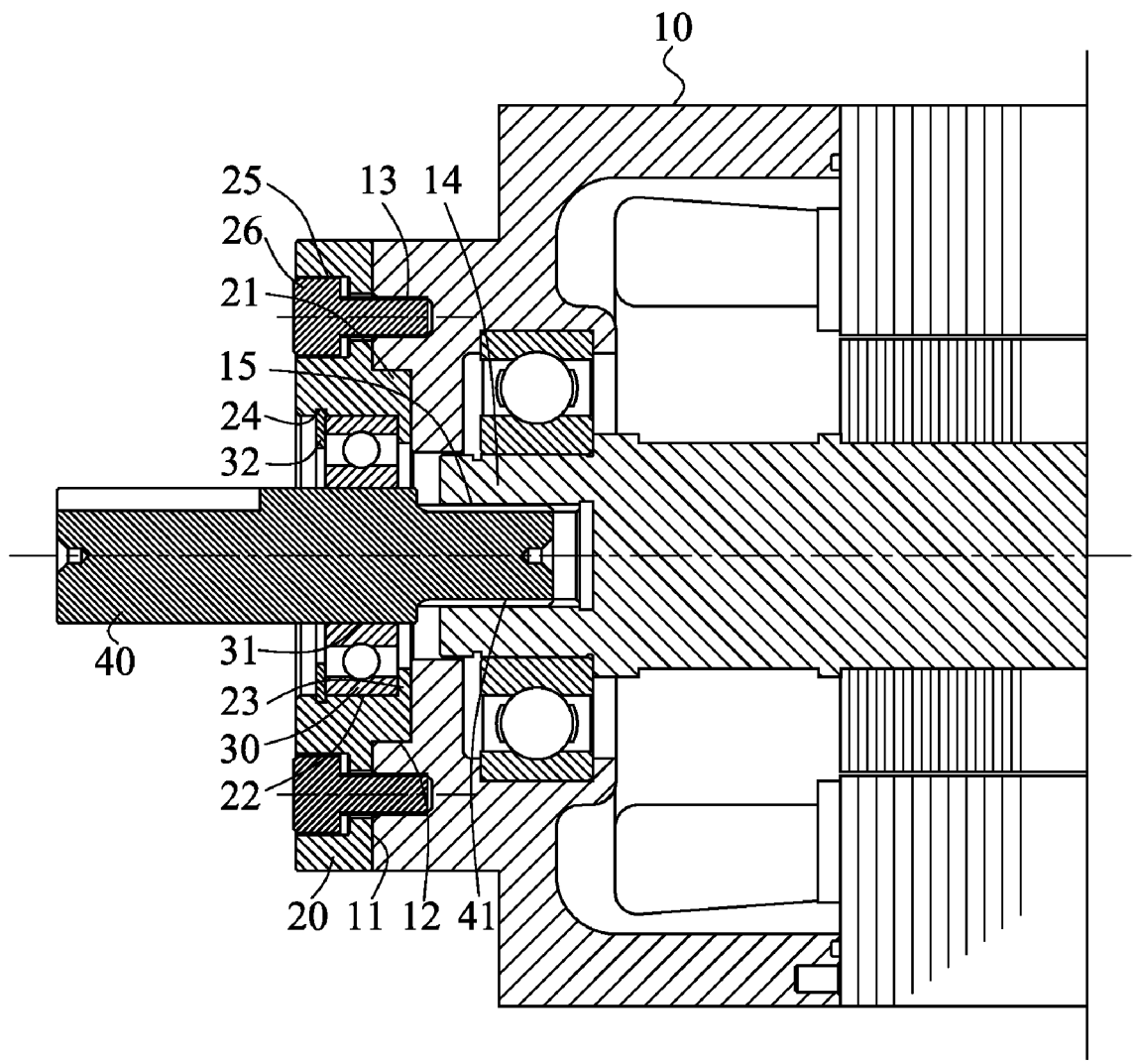
FIG. 4 is a sectional view similar to FIG. 3, but with the shaft extension.
Figure 5:
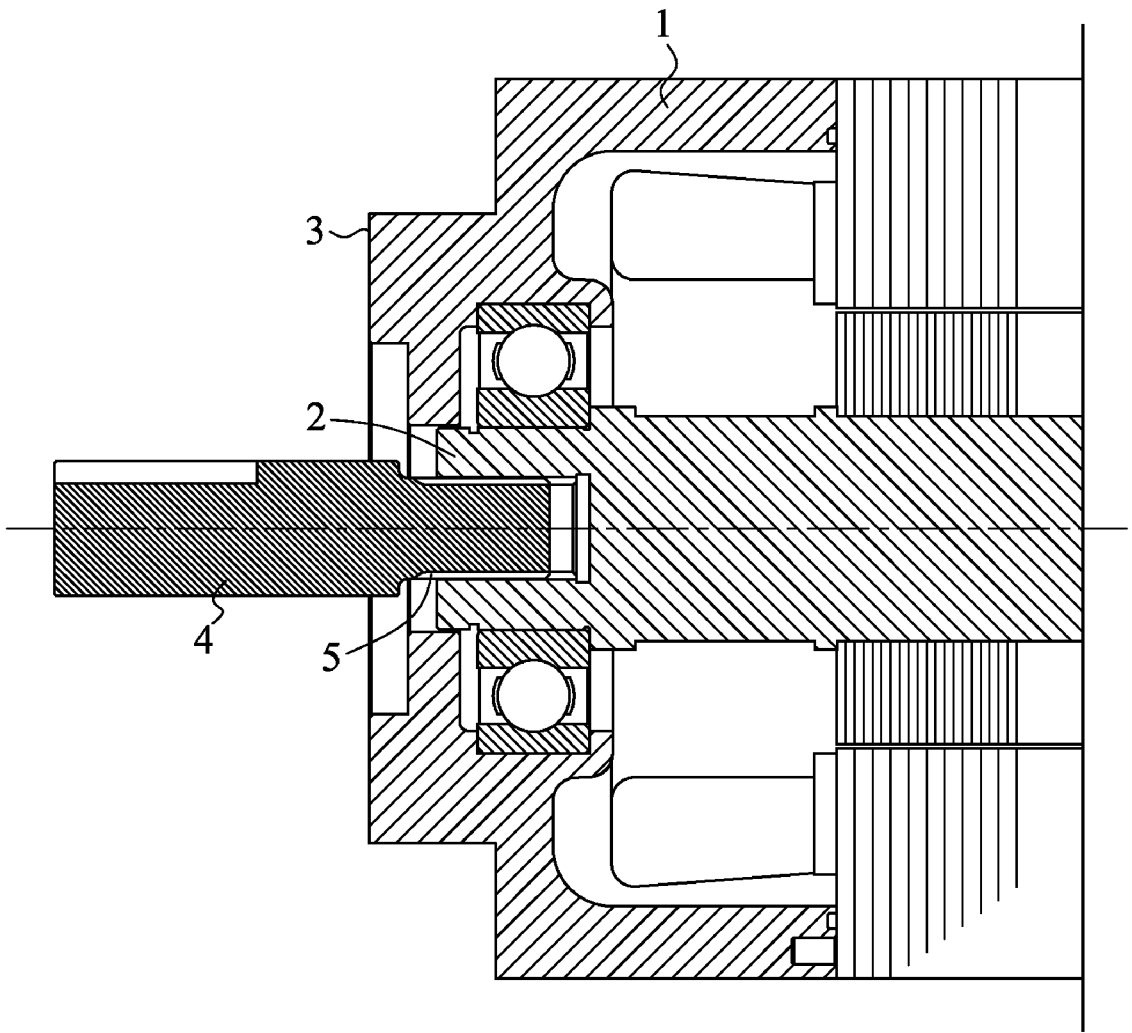
FIG. 5 is a sectional view of a related-art motor.

Referring to FIG. 4, an engaging portion 41 of a shaft extension 40 is engaged with the slot 15 of the shaft 14. The shaft extension 40 protrudes outward beyond the flange facing 11 of the motor 10. The shaft extension 40 engages a load (not shown). The center of the shaft extension 40, received in the inner hole 31 of the bearing 30, and is thus supported by the retainer 20 and bearing 30, therefore effectively suppressing vibration and noise of the shaft extension 40 when the motor 10 is operating. Installation of the shaft extension 40 is easy and accurate. Consequently, shaft extension 40 and shaft 14 provide optimum performance and a fatigue resistance.

It is to be understood that the above-described embodiment are intended to illustrate rather than limit the invention. Variations may be made to the embodiment without departing from the spirit of the invention as claimed. The above-described embodiment illustrates the scope of the invention but do not restrict the scope of the invention.

What is claimed is:

1. A support device for a shaft extension of a motor, the motor including a flange facing and a shaft, the shaft not protruding beyond the flange facing, comprising:
    a retainer including a receiving chamber, the retainer being fastened to the flange facing of the motor;
    a bearing including an inner hole, the bearing being received in the receiving chamber of the retainer, a shaft extension engaged with the shaft of the motor through the inner hole of the bearing and supported by the retainer and bearing.

2. The support device for a shaft extension of a motor as claimed in claim 1, wherein the flange facing of the motor defines a recessed portion, the retainer defines a raised portion for being received in the recessed portion of the motor.

3. The support device for a shaft extension of a motor as claimed in claim 1, wherein the receiving chamber includes an annular groove defined in an end thereof and an annular ledge projecting inward from the other end of the receiving chamber to resist the bearing, and a C-shaped snap ring mounted in the annular groove securing the bearing in the receiving chamber.

4. The support device for a shaft extension of a motor as claimed in claim 3, wherein the retainer defines a plurality of through holes and the flange facing of the motor defines a plurality of screw holes corresponding to the plurality of through holes in the retainer; wherein a plurality of fastening screws engaged with the screw holes in the flange facing via through the corresponding through holes on the retainer, respectively.

5. The support device for a shaft extension of a motor as claimed in claim 4, wherein the retainer, raised portion, and receiving chamber are all cylindrical.

6. The support device for a shaft extension of a motor as claimed in claim 4, wherein the plurality of through holes are spaced equidistant from each other.

7. A motor device, comprising:
    a shaft;
    a flange facing;
    a shaft extension engaged with the shaft; and
    a support device for supporting a shaft extension, comprising:
        a retainer including a receiving chamber, the retainer being fastened to the flange facing of the motor;
        a bearing including an inner hole, the bearing being received in the receiving chamber of the retainer, the shaft extension engaged with the shaft extending through the inner hole of the bearing and supported by the retainer and bearing.

8. The motor device as claimed in claim 7, wherein the flange facing of the motor defines a recessed portion, the retainer defines a raised portion for being received in the recessed portion of the motor.

9. The motor device as claimed in claim 7, wherein the receiving chamber includes an annular groove defined in an end thereof and an annular ledge projecting inward from the other end of the receiving chamber to resist the bearing, and a C-shaped snap ring mounted in the annular groove securing the bearing in the receiving chamber.

10. The motor device as claimed in claim 9, wherein the retainer defines a plurality of through holes and the flange facing of the motor defines a plurality of screw holes corresponding to the plurality of through holes in the retainer; wherein a plurality of fastening screws engaged with the screw holes in the flange facing via through the corresponding through holes on the retainer, respectively.

11. The motor device as claimed in claim 10, wherein the retainer, raised portion, and receiving chamber are all cylindrical.

12. The motor device as claimed in claim 10, wherein the plurality of through holes are spaced equidistant from each other.

* * * * *